US012313235B2

(12) United States Patent
Bungenstock et al.

(10) Patent No.: US 12,313,235 B2
(45) Date of Patent: May 27, 2025

(54) FRESNEL PROJECTION LENS WITH INTEGRATED FUNCTION FOR SATISFYING OVERHEAD SIGN VALUES

(71) Applicant: HELLA GmbH & Co. KGaA, Lippstadt (DE)

(72) Inventors: Carmen Bungenstock, Kleinenberg (DE); Mathias Drueppel, Lippstadt (DE); Gerhard Kloos, Erwitte (DE); Philip Stroop, Schloss Holte-Stukenbrock (DE); Benjamin Willeke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/378,944

(22) Filed: Oct. 11, 2023

(65) Prior Publication Data

US 2024/0117949 A1 Apr. 11, 2024

(30) Foreign Application Priority Data

Oct. 11, 2022 (DE) ..................... 10 2022 126 304.5

(51) Int. Cl.

*F21S 41/275* (2018.01)
*F21S 41/20* (2018.01)
*F21V 5/04* (2006.01)

(52) U.S. Cl.

CPC ........... *F21S 41/275* (2018.01); *F21S 41/285* (2018.01); *F21V 5/045* (2013.01)

(58) Field of Classification Search

CPC ...... F21S 41/275; F21S 41/285; F21S 41/255; F21S 41/265; F21V 5/045

See application file for complete search history.

(56) References Cited

U.S. PATENT DOCUMENTS 3,348,037 A * 10/1967 Goytisolo Taltavull ..................... F21V 21/10 362/431
7,379,240 B2 * 5/2008 Iwaki ..................... G03B 21/62 359/457
2007/0279911 A1 * 12/2007 Kittelmann ............. F21V 5/045 362/326
2015/0003081 A1 * 1/2015 Kobayashi ............. G03B 15/05 362/326
2017/0227190 A1 * 8/2017 Fujikawa ................. G02B 1/04
2018/0224715 A1 * 8/2018 Coughenour ........... F21V 5/045
2019/0024871 A1 * 1/2019 Gloss .................... F21S 41/265
2019/0195455 A1 * 6/2019 Chen ..................... F21S 41/275

(Continued)

FOREIGN PATENT DOCUMENTS

FR 2799153 A1 4/2001

*Primary Examiner* — Zheng Song

(74) *Attorney, Agent, or Firm* — Muncy, Geissler, Olds & Lowe, P.C.

(57) ABSTRACT

A Fresnel projection lens for a headlight of a motor vehicle having a light entry surface, wherein the light entry surface has a smooth or substantially smooth surface, and with a light exit surface. The light exit surface has a plurality of adjacent, in particular annular, flanks, wherein one flank each comprises a bottom, an effective facet, and an interfering facet arranged at a first pitch angle to the effective facet. The effective facet and the interfering facet form a cut edge opposite the bottom. A pass-through area is provided on at least one of the flanks, wherein the pass-through area is angled to the effective facet.

15 Claims, 4 Drawing Sheets

(56) References Cited

U.S. PATENT DOCUMENTS

| | | | | |
|---|---|---|---|---|
| 2019/0226655 | A1* | 7/2019 | Shimano | F21S 41/285 |
| 2019/0235263 | A1* | 8/2019 | Shinohara | G02B 6/0036 |
| 2023/0358385 | A1* | 11/2023 | Mandl | F21S 41/147 |

* cited by examiner

FRESNEL PROJECTION LENS WITH INTEGRATED FUNCTION FOR SATISFYING OVERHEAD SIGN VALUES

This nonprovisional application claims priority under 35 U.S.C. § 119(a) to German Patent Application No. 10 2022 126 304.5, which was filed in Germany on Oct. 11, 2022, and which is herein incorporated by reference.

BACKGROUND OF THE INVENTION

Field of the Invention

The invention relates to a Fresnel projection lens for a headlight of a motor vehicle, to a headlight for a motor vehicle, and to a motor vehicle.

Description of the Background Art

In order to meet legal requirements, a headlight must fulfill the so-called overhead sign values in the low beam mode. This requirement serves to ensure that, for example, highway signs mounted above the roadway can be safely recognized and read by the driver.

The light intensities to be achieved at the corresponding measuring points are comparatively low. These measuring points are at large, positive vertical angles. The requirement of having to satisfy these measuring points is somewhat at odds with the main requirement for a low beam, namely, the condition that no or hardly any light should be emitted into the traffic area above a horizontal boundary, the so-called cut-off line. Basically, the entire headlight is designed for this.

Previously used technical measures to provide the overhead sign values include, for example, subsequently introducing grooves or notches or circumferential beads with a refractive effect into a projection lens that was initially calculated and manufactured as a perfectly imaging collimating lens. This means an additional process step in the production. Often, this measure adversely affects the appearance of the Fresnel projection lens. For example, a slight thickening (bead) running horizontally around the Fresnel projection lens may be perceived as annoying by customers.

An alternative measure used so far to achieve the overhead sign values is to introduce additional reflective elements into the headlight optics, which, for example, deflect a small part of the light coming from the primary optics toward high vertical angles. Such technical measures have disadvantages similar to the insertion of grooves or notches or the application of beads.

With the above measures, the geometry that provides the desired effect must be found and determined in optimization loops. This refers to both the lighting design and the manufacturing implementation of the specified geometry.

SUMMARY OF THE INVENTION

It is therefore an object of the present invention to at least partially overcome at least one of the above-described disadvantages in headlights of a motor vehicle. In particular, it is an object of the invention to provide a Fresnel projection lens for a headlight of a motor vehicle, a headlight for a motor vehicle, as well as a motor vehicle with optimized integration of the overhead sign values, without impairing the collimation effect of the lens.

The foregoing object is achieved in an exemplary embodiment by a Fresnel projection lens, by a headlight, and by a vehicle. In this regard, features and details that are described in relation to the safety system of the invention also apply, of course, in relation to the method of the invention or in relation to the vehicle of the invention, and conversely in each case, so that with regard to the disclosure, reference is or can always be made mutually to the individual aspects of the invention.

According to the invention, a Fresnel projection lens is provided for a headlight of a motor vehicle having a light entry surface, wherein the light entry surface has a smooth or substantially smooth surface, and having a light exit surface, wherein the light exit surface has a plurality of adjacent, in particular annular, flanks, wherein one flank each comprises a bottom, an effective facet, and an interfering facet arranged at a first pitch angle to the effective facet, wherein the effective facet and the interfering facet form a cut edge opposite to the bottom, wherein a pass-through area is provided on at least one of the flanks, wherein the pass-through area is angled to the effective facet.

A Fresnel projection lens designed in this way enables the light from a light source to pass through directly or substantially directly without being refracted or only slightly refracted. As a result, areas, in particular the overhead sign areas limited by the overhead sign values, outside a light cone of the low beam can be illuminated with a low light intensity. At the same time, the use of the pass-through areas of the main headlight reduces the glare in the low beam function.

The flanks can have a triangular or substantially triangular cross section. In this case, the bottom of the flank can have a curvature.

The flanks are designed in such a way that the light from a light source is refracted to a large extent via the effective facet and only a small part of the light is refracted via the interfering facet. It is advantageous for a Fresnel projection lens in this regard if the adjacent flanks differ at least slightly in their geometry. The first pitch angle, therefore, the angle between the effective facet and the interfering facet, must be designed in such a way that the effective facets of the flanks have a common refractive power. Accordingly, the pitch angles of the respective adjacent flanks differ from each other.

The different first pitch angles have the result that a parallel or substantially parallel beam path forms starting from a light source after passage of the individual effective facets, therefore, after refraction of the light at the effective facets.

This has the result that the Fresnel projection lens can be made flatter, so that material can be saved. Further, steps can be saved in the manufacturing process, because the subsequent introduction of grooves or recesses into the Fresnel projection lens or the placement of additional elements on or within the optics can be dispensed with.

It is particularly advantageous if the flanks and thus also the pass-through area are formed annular. This makes Fresnel projection lenses easier to design and manufacture.

The pass-through area can be arranged at a second pitch angle to the effective facet, wherein the second pitch angle is different from the first pitch angle.

The second pitch angle can be designed or calculated in such a way that the light is refracted only slightly, in particular not at all, during the passage of light. This enables the illumination of defined areas outside the defined light cone. These defined areas are specified by the overhead sign values. These areas must be illuminated at least in such a way that, for example, road signs can be read in the dark without blinding oncoming traffic.

The pass-through areas of a flank can be formed circumferential.

The circling of the pass-through area can ensure continuous illumination of the legally specified overhead sign values.

In order to create sufficient light passage through the pass-through areas, without blinding traffic, it is advantageous if the height of the pass-through areas corresponds to 40% to 95%, preferably 50% to 90%, of the height of the flank.

In this case, the height of the flank can be understood as the distance between the bottom of the flank and the cut edge of the effective facet and the interfering facet. The height of the pass-through area is the distance between the bottom of the flank and the pass-through area.

Further, it is conceivable that a maximum of 15%, preferably a maximum of 12%, further preferably 10%, of the flanks have a pass-through area.

A low light intensity is sufficient to achieve the overhead sign values or to meet the legal requirements. The other flanks in this regard generate the low beam or the generally well illuminated area.

At least two flanks can have a pass-through area. Sufficient illumination of the areas specified by the overhead sign values can be achieved thereby.

Further, it is conceivable that a maximum of five flanks, preferably a maximum of four flanks, further preferably a maximum of three flanks, have a pass-through area.

Here, the number of flanks with a pass-through area depends on the desired and/or legally specified intensity of the passing light in the area of the overhead sign values.

Within the scope of the invention, it is conceivable that the flanks with pass-through areas are arranged adjacent and/or alternating.

In the present context, alternating can mean that at least one flank without a pass-through area may be provided between two flanks with a pass-through area. Depending on the number, it is conceivable that two flanks with a pass-through area are adjacent and a third (or even fourth) flank is arranged alternately. The arrangement of the flanks with a pass-through area positively influences the size of the overhead sign area next to the light cone and its intensity.

It is particularly advantageous for the accuracy of the lower intensity areas, therefore, the overhead sign areas, if the second pitch angle of adjacent and/or alternating flanks with a pass-through area differs from one another.

The flanks with pass-through areas can be arranged in an aspherical region of the Fresnel projection lens. This makes it possible to minimize the number of flanks with pass-through areas.

The Fresnel projection lens can be cast, in particular injection molded.

The Fresnel projection lenses can be manufactured more easily by casting. Here, the subsequent introduction of grooves or recesses into the Fresnel projection lens or the placement of additional elements on or within the optics can be dispensed with.

Advantageously, the Fresnel projection lens can have a plastic, in particular polymethyl methacrylate or polycarbonate. These can be easy to cast, preferably injection molded, wherein at the same time the production can be made cost-effective.

Alternatively, it is also conceivable to fabricate the Fresnel projection lens from glass. This allows a higher precision of the light passage across the pass-through area and/or the effective facet.

The Fresnel projection lens can be concave and/or convex. By this it is understood that the Fresnel projection lens can also be bi-convex, plano-convex, concave-convex, convex-concave, plano-concave, or bi-concave. The focal points of the Fresnel projection lens can be easily adapted thereby to customer-specific requirements.

The above object is further achieved by a headlight for a motor vehicle, having a housing and having a light unit with at least one light source, wherein the headlight, in particular the light unit, has a Fresnel projection lens described above.

The above object is further achieved by a motor vehicle having an above-described headlight.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
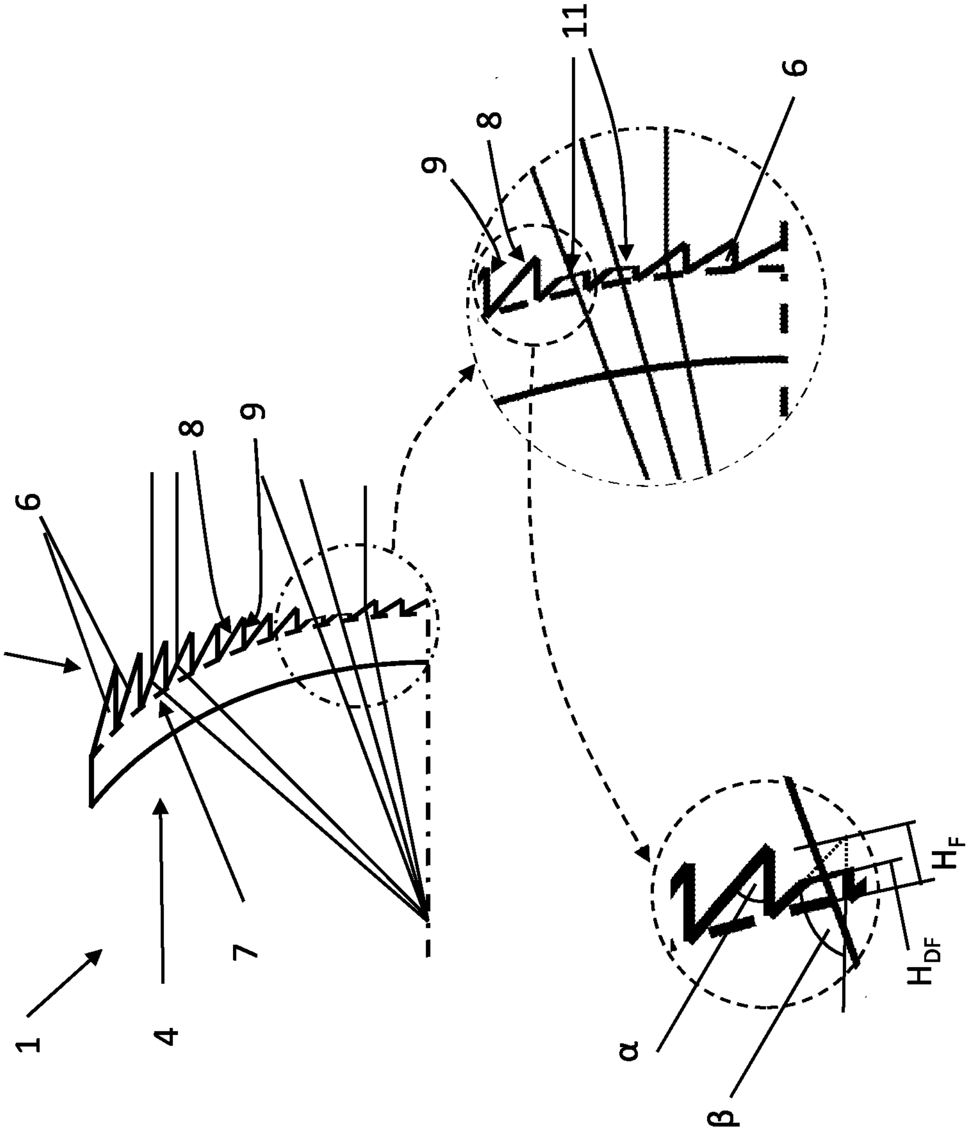
FIG. 1 is a schematic diagram of a Fresnel projection lens in cross section.
Figure 2:
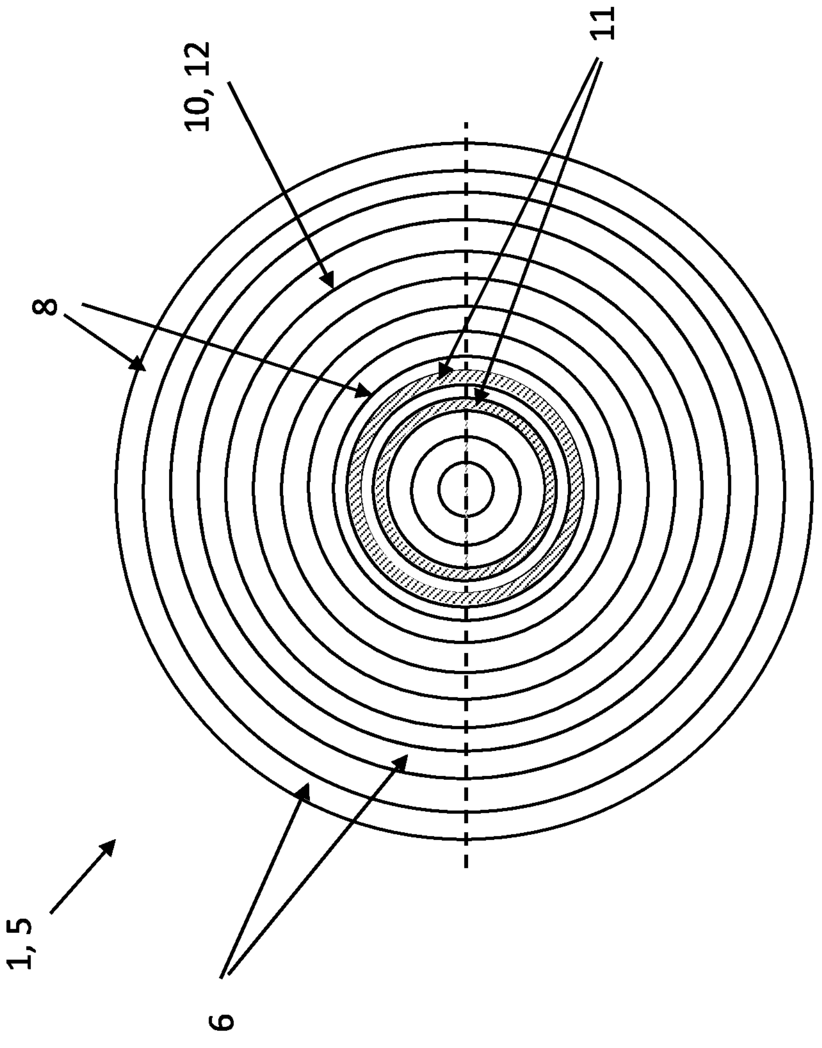
FIG. 2 is a schematic diagram of a Fresnel projection lens in a top plan view.

A Fresnel projection lens 1 for a headlight 2 of a motor vehicle 3 is shown in FIG. 1 and FIG. 2. Fresnel projection lens 1 has a light entry surface 4, wherein light entry surface 4 has a smooth or substantially smooth surface, and a light exit surface, wherein the light exit surface 5 has a plurality of adjacent, in particular annular, flanks 6. In this regard, one flank 6 each has a bottom 7, an effective facet 8, and an interfering facet 9 arranged at a first pitch angle α to effective facet 8, wherein effective facet 8 and interfering facet 9 form a cut edge 10 opposite bottom 7. In the present case, a pass-through area 11 is provided on at least one of flanks 6, wherein pass-through area 11 is angled to effective facet 8.

Pass-through area 11 is arranged here at a second pitch angle β to interfering facet 9. The second pitch angle β between interfering facet 9 and pass-through area 11 differs from the first pitch angle α between effective facet 8 and interfering facet 9.

In the example according to FIG. 2, the lens is a round or substantially round Fresnel projection lens 1. In the top plan view (FIG. 2), it can be seen that pass-through area 11 of a flank 6 is formed circumferentially. However, it is also possible that pass-through area 11 is interrupted once or even several times. Further, the difference to flanks 6 without pass-through areas 11 can be seen. This is because, in contrast to flanks 6 with pass-through area 11, which can be identified in the top plan view by a circumferential area, effective facet 8 and interfering facet 9 form a cut edge 10, which is shown in the top plan view as a circumferential edge 12 or line.

The height $H_{DF}$ of pass-through area 11 or pass-through areas 11 corresponds to 40% to 95% of the height $H_F$ of flank 6. Here, the height $H_F$ of flank 6 is the distance between bottom 7 of flank 6 and cut edge 10 of effective facet 8 and interfering facet 9. The height $H_{DF}$ of pass-through area 11 is the distance between bottom 7 of flank 6 and pass-through area 11.

To ensure the anti-glare function, therefore, to ensure that most of the light is refracted, in a Fresnel projection lens 1 according to FIGS. 1 and 2, at most 15% of flanks 6 are a flank 6 with a pass-through area 11.

In this context, when designing Fresnel projection lens 1 to achieve the overhead sign values, it has proven advantageous if at least two flanks 6 have a pass-through area 11.

Regardless of the size of Fresnel projection lens 1, however, care should be taken that a maximum of five flanks 6 have a pass-through area 11, wherein three flanks 6 turned out to be optimal.

Depending on the size of Fresnel projection lens 1 and the number of pass-through areas 11 in the overhead sign area, flanks 6 with pass-through areas 11 may be arranged adjacent and/or alternating.

In the example according to FIGS. 1 and 2, two flanks 6 are provided in the cross section of a half Fresnel projection lens 1, therefore, four flanks 6 calculated for the entire Fresnel projection lens 1. These form two continuous annular flanks 6 due to the rotational symmetry of Fresnel projection lens 1, wherein flanks 6 are arranged adjacent to each other.

In this case, the second pitch angle β of adjacent flanks 6 with pass-through areas 11 differs from each other. This also applies to the case when they are arranged alternately, therefore, with a flank 6 without a pass-through area 11.

Furthermore, flanks 6 with pass-through areas 11 are arranged in an aspherical region of the concave-convex Fresnel projection lens 1.

Fresnel projection lens 1 according to FIG. 1 and FIG. 2 is injection molded from a plastic. Polymethyl methacrylate was used for this purpose.

Figure 3:
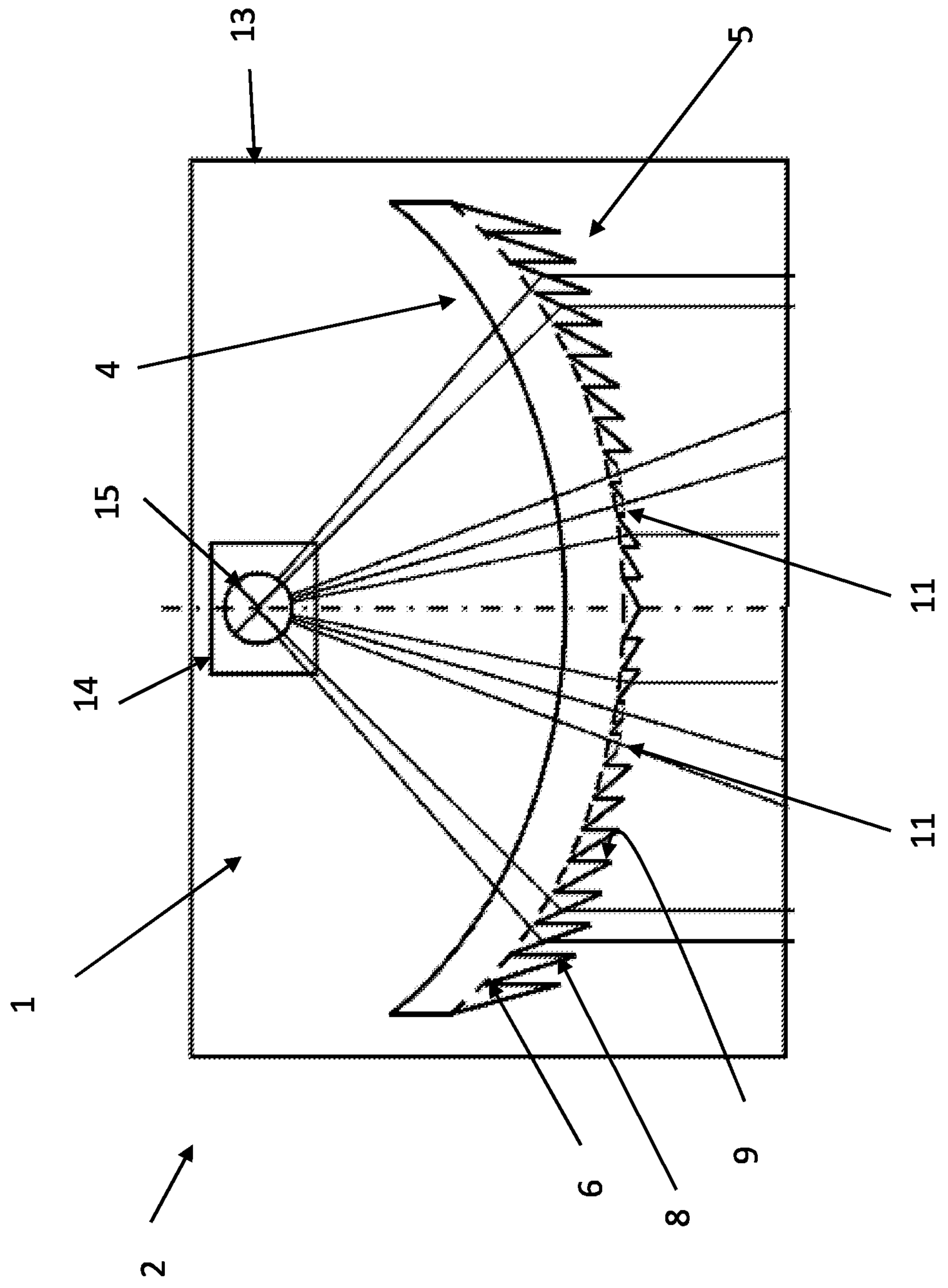
FIG. 3 is a schematic diagram of a headlight with a Fresnel projection lens according to FIG. 1.

FIG. 3 schematically shows a headlight 2 for a motor vehicle 3, with a housing 13 and with a light unit 14 with at least one light source 15, wherein headlight 2, in particular light unit 14, has a Fresnel projection lens 1, wherein Fresnel projection lens 1 is designed according to FIGS. 1 and 2.

Figure 4:
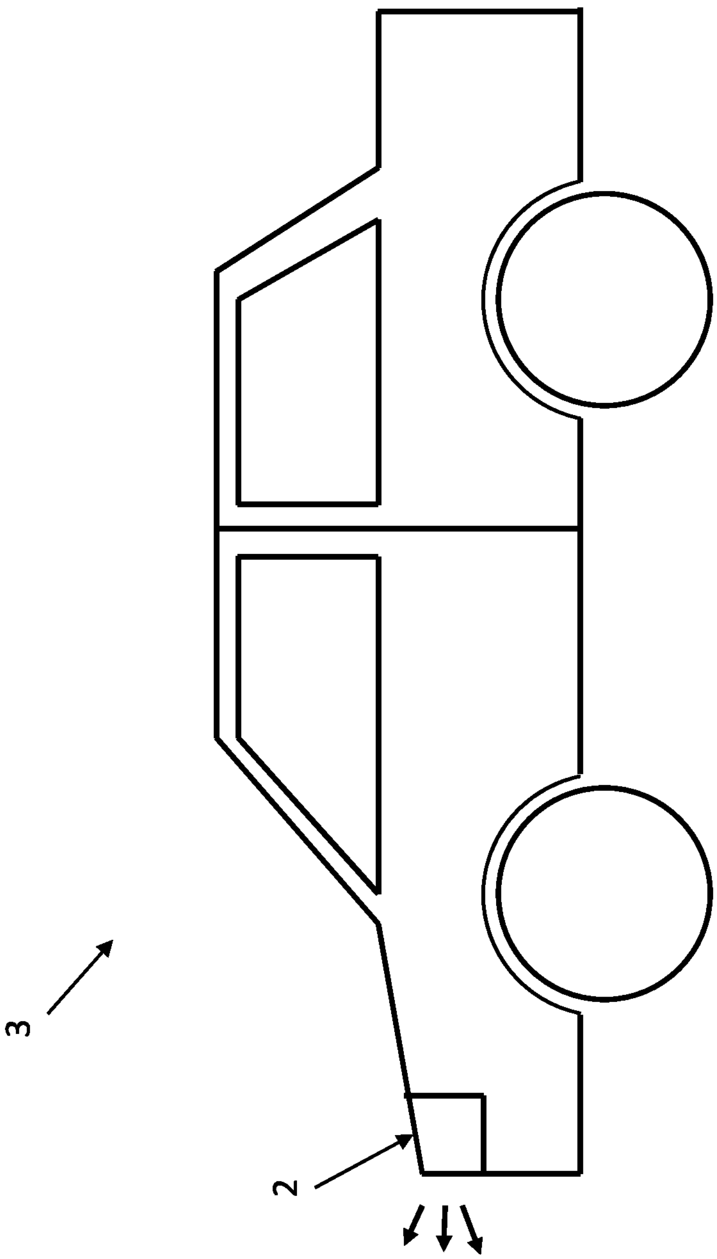
FIG. 4 is a schematic diagram of a motor vehicle with a headlight according to FIG. 2.

FIG. 4 shows a motor vehicle 3 with a headlight 2 described above.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A Fresnel projection lens for a headlight of a motor vehicle, the Fresnel projection lens comprising:

a light entry surface having a smooth or substantially smooth surface;

a light exit surface having a plurality of adjacent annular flanks, wherein each flank comprises a bottom, an effective facet, and an interfering facet located at a first pitch angle to the effective facet, the effective facet and the interfering facet forming a cut edge opposite the bottom, wherein at least one of the flanks is truncated to provide a pass through area, the pass through area being a facet that is opposite the bottom and extends from the effective facet to the interfering facet, such that the pass through area is angled to the effective facet and angled to the interfering facet.

2. The Fresnel projection lens according to claim 1, wherein the pass through area is arranged at a second pitch angle to the interfering facet, and wherein the second pitch angle is different from the first pitch angle.

3. The Fresnel projection lens according to claim 1, wherein the pass-through area is formed circumferentially.

4. The Fresnel projection lens according to claim 1, wherein a height of the pass-through area corresponds to 40% to 95% of the height of the flank.

5. The Fresnel projection lens according to claim 1, wherein a maximum of 15% of the flanks have the pass-through area.

6. The Fresnel projection lens according to claim 1, wherein at least two of the flanks have the pass-through area.

7. The Fresnel projection lens according to claim 1, wherein a maximum of five of the flanks have the pass-through area.

8. The Fresnel projection lens according to claim 2, wherein the flanks with the pass-through areas are arranged adjacent and/or alternating.

9. The Fresnel projection lens according to claim 8, wherein the second pitch angle of the adjacent and/or alternating flanks with the pass-through areas differs from each other.

10. The Fresnel projection lens according to claim 1, wherein the flanks with the pass-through areas are arranged in an aspherical region of the Fresnel projection lens.

11. The Fresnel projection lens according to claim 1, wherein the Fresnel projection lens is cast or injection molded.

12. The Fresnel projection lens according to claim 1, wherein the Fresnel projection lens is formed of a plastic, polymethyl methacrylate, or polycarbonate.

13. The Fresnel projection lens according to claim 1, wherein the Fresnel projection lens is concave or convex.

14. A headlight for a motor vehicle comprising:

a housing;

a light unit with at least one light source; and the Fresnel projection lens according to claim 1.

15. A motor vehicle with the headlight according to claim 14.

* * * * *